(No Model.)
C. E. SCRIBNER.
SPRING JACK FOR TELEPHONE SYSTEMS.
No. 300,143. Patented June 10, 1884.
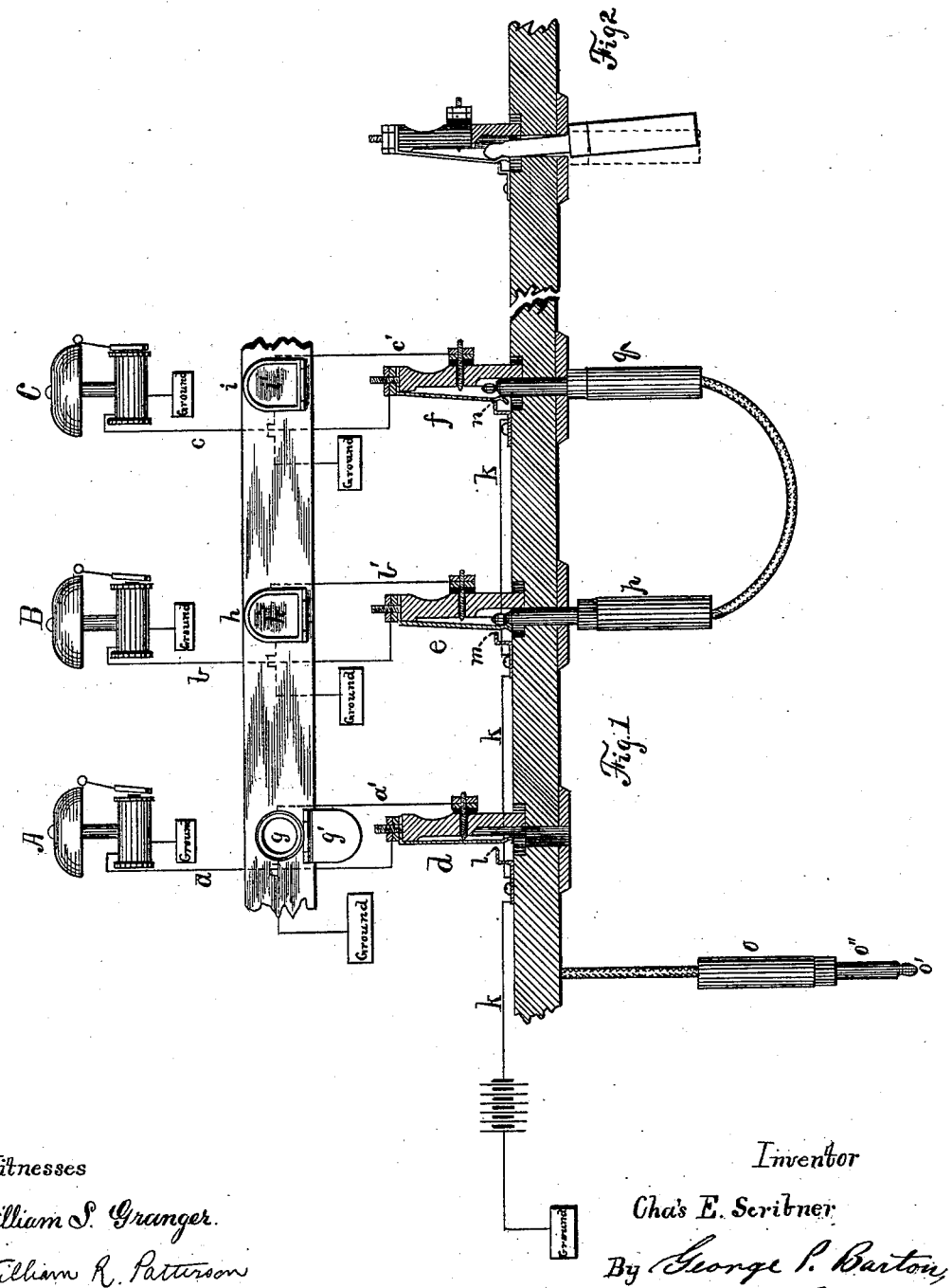
Witnesses
William S. Granger.
William R. Patterson
Inventor
Cha's E. Scribner
By George P. Barton,
Attorney

UNITED STATES PATENT OFFICE.

CHARLES E. SCRIBNER, OF CHICAGO, ILLINOIS, ASSIGNOR, BY MESNE ASSIGNMENTS, TO THE WESTERN ELECTRIC COMPANY, OF SAME PLACE.

SPRING-JACK FOR TELEPHONE SYSTEMS.

SPECIFICATION forming part of Letters Patent No. 300,143, dated June 10, 1884.

Application filed May 21, 1881. (No model.)

*To all whom it may concern:*

Be it known that I, CHARLES E. SCRIBNER, of Chicago, Illinois, have discovered certain new and useful Improvements in Spring-Jack Telephone-Switches, of which the following is a full, clear, concise, and exact description.

In the drawings, Figure 1, A, B, and C represent three subscribers' terminal stations connected with the central office by their respective telephone-lines a, b, and c, which pass through spring-jacks d, e, and f upon the switch-board. These telephone-circuits are normally closed to ground through annunciators. Thus the circuit of line a passes to the spring-jack d, thence by line a' through annunciator g to ground in the usual manner. The shutter g' is shown down, as if a call had just been sent in. The circuits of lines b and c in like manner pass to their respective bolts e f, and thence through their annunciators h and i to ground. The shutters h' and i' are shown restored to their normal positions. The normally-open battery-circuit k is connected with points l m n, &c., so that when a plug is inserted in any spring-jack the switchman, by crowding the plug clear in or crowding it to one side or in any other suitable manner, may connect the calling-battery with the circuit of the subscriber connected with the spring-jack.

Heretofore the spring-jack and plug have been used simply to take off the ground and connect the subscribers, and a separate cord with a terminal plug was provided for the calling-battery, while a separate key was provided for signaling. In some instances the cord which connected the two subscribers was connected through a key or keys so arranged that the calling-battery was thrown to one line or the other, or to both, when the key or one or the other of the keys was depressed.

My improvement consists in connecting the calling-battery with a point near the lever of each spring-jack, and so constructing the plug that the switchman may by means of the plug connect any subscriber's line with a contact-point connecting with the calling-battery, and thus signal the subscriber. The contact-points l, m, and n are placed near the levers of their respective switches. The plugs o p q are provided with tips with ends smaller than the upper portions of the tips. Thus the end o' is smaller than the portion o".

The lever of spring-jack e is shown resting upon the end of the tip of the plug p. The line b is thus connected with the line of any other subscriber, and the ground removed in the usual manner. By crowding the plug farther in, the line is brought in contact with contact-point m, and thus the calling-battery may be thrown to line. Plug q is shown thus inserted, and the circuit of the calling-battery is thus closed to line by contact formed at point n. The plug is thus made to serve as a key for calling, in addition to its other uses.

In Fig. 2 I have shown a modified form of plug, which may be used as a lever to pry the switch-lever into contact with the contact-point of the local battery, as shown. The point of the plug may be made angular instead of smaller, so that by simply twisting the plug the switch-lever will be brought against the contact-point of the calling-battery.

As to the state of the art prior to my invention, reference is made to Patent No. 250,140, to Fearey, issued November 29, 1881.

I claim—

1. The combination, in the circuit of the signaling-battery of a telephone-exchange, of contact-points l m n—one near each spring-jack—and plugs which, while inserted in the spring-jacks, are adapted to force the line-strips or contact-springs respectively into contact with said contact-points, as and for the purpose specified.

2. The combination of spring-jack d with contact-point l and plug o, said plug being smaller at o' than at o", whereby the signaling-battery may be thrown to line a, as and for the purpose specified.

CHARLES E. SCRIBNER.

Witnesses:
WILLIAM S. GRANGER,
J. WAYLAND CLARK.